(12) United States Patent  
Dong

(10) Patent No.: US 12,501,389 B2  
(45) Date of Patent: Dec. 16, 2025

(54) PRS CONFIGURATION PROCESSING METHOD AND APPARATUS, AND COMMUNICATION DEVICE, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 591 days.

(21) Appl. No.: 17/996,976

(22) PCT Filed: Apr. 26, 2020

(86) PCT No.: PCT/CN2020/087055  
§ 371 (c)(1),  
(2) Date: Oct. 24, 2022

(87) PCT Pub. No.: WO2021/217306  
PCT Pub. Date: Nov. 4, 2021

(65) Prior Publication Data  
US 2023/0224848 A1    Jul. 13, 2023

(51) Int. Cl.  
*H04L 1/00* (2006.01)  
*H04W 64/00* (2009.01)

(52) U.S. Cl.  
CPC .................... *H04W 64/00* (2013.01)

(58) Field of Classification Search  
CPC ............................. H04W 64/00; H04W 4/02  
USPC ....................................................... 455/456.1  
See application file for complete search history.

(56) References Cited

U.S. PATENT DOCUMENTS 10,736,074 B2    8/2020  Edge et al.  
2021/0092558 A1*  3/2021  Duan ................ H04L 25/03343

FOREIGN PATENT DOCUMENTS

| CN | 110192117 A | 8/2019 |
| WO | WO 2018143870 A1 | 8/2018 |
| WO | WO 2020046483 A1 | 3/2020 |

OTHER PUBLICATIONS

Physical layer procedure for NR positioning, 3GPP TSG RAN WG1 Meeting #98bis Chongqing, China, Oct. 14-20, 2019 (Year: 2019).*  
European Patent Office, Extended European Search Report issued in Application No. 20934204.7 dated Nov. 20, 2023, 11 pages.  
LG Electronics, "Discussions on DL only based Positioning", 3GPP TSG RAN WG1 Ad Hoc Meeting 1901, R1-1900629, Taipei, Taiwan, Jan. 21-25, 2019, 9 pages.  
Office Action for China Application No. 202080000809.8, issued on May 20, 2023, 15 pages.

(Continued)

*Primary Examiner* — Tanmay K Shah  
(74) *Attorney, Agent, or Firm* — Finnegan, Henderson, Farabow, Garrett & Dunner, L.L.P.

(57) ABSTRACT

A method for processing a position reference signal (PRS) configuration, includes: sending, by a location management function (LMF), first configuration information including a plurality of sets of PRS configurations, wherein the plurality of sets of PRS configurations correspond to a same base station or a same transmission reception point (TRP), and each of the plurality of sets of PRS configurations is configured for a positioning measurement of user equipment (UE).

14 Claims, 9 Drawing Sheets

(56) References Cited

OTHER PUBLICATIONS

Huawei, HiSilicon: "Physical layer procedure for NR positioning", 3GPP TSG RAN WG1 Meeting #98bis, R1-1910036, Chongqing, China, Oct. 14-20, 2019, 17 pages.
Huawei, HiSilicon: "Considerations on downlink-only positioning method in NR", 3GPP TSG-RAN WG2 Meeting #107bis, R2-1903037, Prague, CZ, Aug. 26-30, 2019, 9 pages.
Examination report for India Application No. 202247065438, issued on Jan. 10, 2023, 6 pages.
International Search Report and Written Opinion for PCT Application No. PCT/CN2020/087055, issued Jan. 27, 2021.
Vivo: "Discussion on UE and gNB measurements for NR positioning", 3GPP TSG RAN WG1 #98bis, R1-1910239, Chongqing, China, Oct. 14-20, 2019, 7 pages.

\* cited by examiner

PRS CONFIGURATION PROCESSING METHOD AND APPARATUS, AND COMMUNICATION DEVICE, AND STORAGE MEDIUM

CROSS-REFERENCE TO RELATED APPLICATION

This application is a U.S. national phase of International Application No. PCT/CN2020/087055, filed Apr. 26, 2020, the entire content of which is incorporated herein by reference.

TECHNICAL FIELD

The disclosure relates to but is not limited to afield of wireless communication technologies, and particularly to a method for processing a position reference signal (PRS) configuration, an apparatus for processing a PRS configuration, a communication device and a storage medium.

BACKGROUND

The fifth generation cellular mobile communication (5th Generation, 5G) R16 introduces a variety of positioning technologies, which can realize positioning of a User Equipment (UE). For some of these positioning technologies, a location management function (LMF) is required to provide positioning assistance information to the UE. The LMF here is a communication entity.

Therefore, the LMF sends the positioning assistance information to the UE through a long term evolution position protocol (LPP) message. Specifically, a serving base station of the UE sends the positioning assistance information to the UE through a radio resource control (RRC) message in a transparent transmission manner. In addition, the LMF may send the positioning assistance information to the base station through a new radio positioning protocol a (NRPPa) message, and then the base station sends it to the UE through the system message in a broadcast manner.

SUMMARY

Embodiments of the disclosure provide a method for processing a position reference signal (PRS) configuration, an apparatus for processing a PRS configuration, a communication device and a storage medium.

According to a first aspect of the disclosure, a method for processing a PRS configuration is provided. The method is applied in an LMF and includes sending first configuration information including a plurality of sets of PRS configurations, in which the plurality of sets of PRS configurations correspond to a same base station or a same transmission reception point (TRP), and each set of PRS configurations is configured for a positioning measurement of a user equipment (UE).

According to a second aspect of the disclosure, a method for processing a PRS configuration is provided. The method includes receiving first configuration information including a plurality of sets of PRS configurations, in which the plurality of sets of PRS configurations correspond to a same base station or a same transmission reception point (TRP), and each set of PRS configurations is configured for a positioning measurement of a user equipment (UE).

According to a third aspect of the disclosure, a communication device is provided. The communication device includes a processor, a transceiver, a memory and executable programs stored the memory and executed by the processor. When the processor executes the executable programs, the method provided in the first aspect or the second aspect is performed.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first". "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

Figure 1:
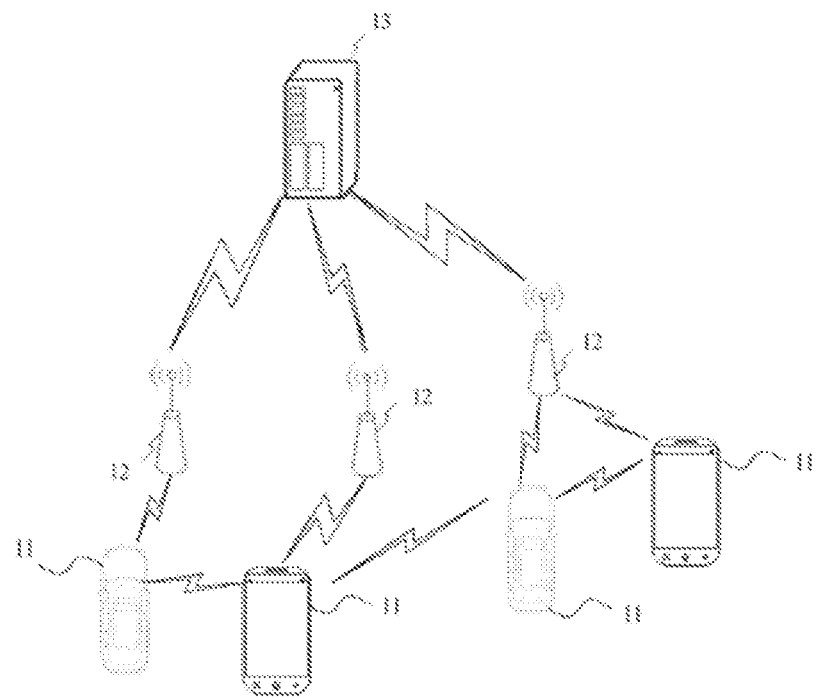
FIG. 1 is a schematic diagram illustrating a wireless communication system according to an embodiment.

With reference to FIG. 1, FIG. 1 is a schematic diagram illustrating a wireless communication system according to an embodiment of the disclosure. As illustrated in FIG. 1, the wireless communication system is a communication system based on the cellular mobile communication technology. The wireless communication system may include several terminals 11 and several base stations 12.

The terminal 11 may be a device that provides voice and/or data connectivity to a user. The terminal 11 can communicate with one or more core networks via a radio access network (RAN). The terminal 11 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, or a user equipment (UE). Alternatively, the terminal 11 may also be a device of an unmanned aerial vehicle. Alternatively, the terminal 11 may also be an in-vehicle device, for example, the terminal 11 may be a vehicle-mounted computer with a wireless communication function, or a wireless communication device externally connected to a vehicle-mounted computer. Alternatively, the terminal 11 may also be a roadside device, for example, a road light with a wireless communication function, a traffic light or other roadside devices and so on.

The base station 12 may be a network side device in the wireless communication system. The wireless communication system may be a 4th generation mobile communication (4G) system, also known as the long term evolution (LTE) system. The wireless communication system may be a 5G system, also known as the new radio (NR) system or 5G NR system. Alternatively, the wireless communication system may also be a next-generation system of the 5G system. An access network in the 5G system may be called as a new generation radio access network (NG-RAN), or a machine-type communication (MTC) system.

The base station 12 may be a base station (eNB) adopting a centralized and distributed architecture in the 4G system. Alternatively, the base station 12 may be a base station (gNB) adopting a centralized and distributed architecture in the 5G system. When the base station 12 adopts the centralized and distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 12.

A wireless connection can be established between the base station 12 and the terminal 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the terminals 11, for example a vehicle to vehicle (V2V) communication, a vehicle to infrastructure (V2I) communication, vehicle to pedestrian (V2P) communication and other scenarios in the vehicle to everything (V2X) communication.

Alternatively, the wireless communication system may further include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

Figure 2A:
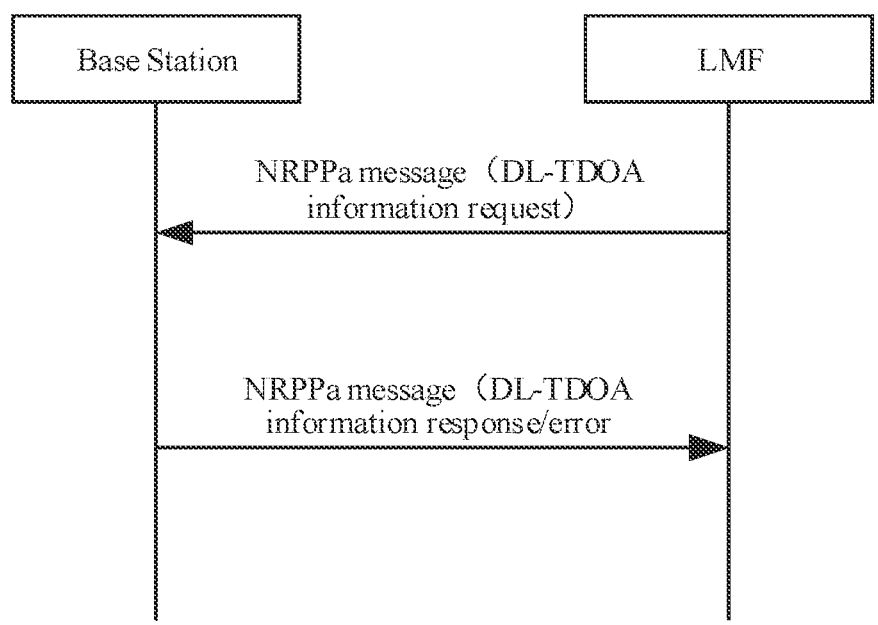
FIG. 2A is a schematic diagram illustrating an information interaction method between an LMF and a UE according to an embodiment.

FIG. 2A shows that, the LMF exchanges various information for PBS positioning (for example, including but not limited to a set of PRS configurations) with the base station (including but not limited to gNB) through a NRPPa message specified by a NRPPa protocol. For example, in FIG. 2A, the LMF requests a downlink time difference of arrival (DL-TDOA) request from the gNB.

The request includes the set of PRS configurations recommended by the LMF. The gNB sends a DL-TDOA response to the LMF after receiving the request. The DL-TDOA response includes PRS configuration information of the base station. The base station sends a PRS based on the PRS configuration information.

Figure 2B:
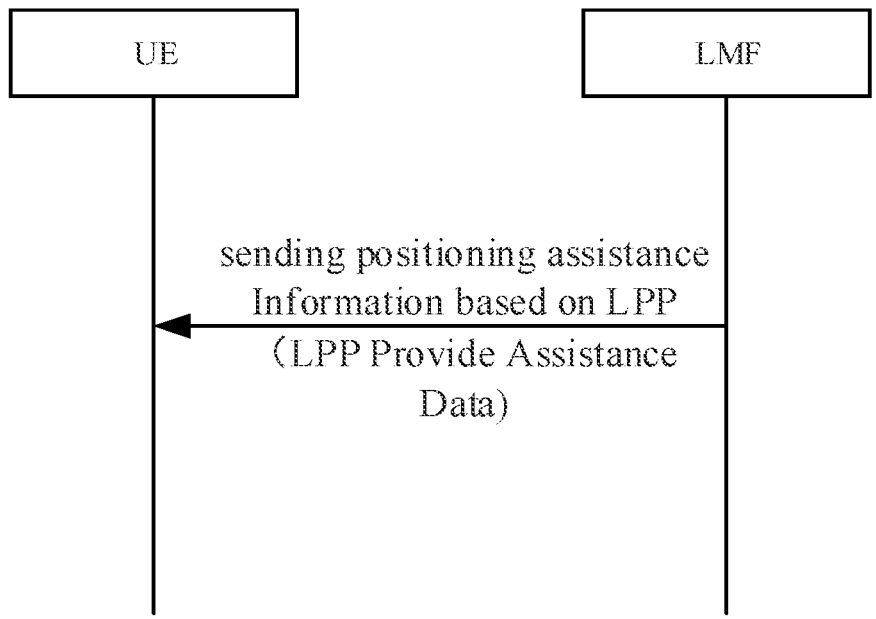
FIG. 2B is a schematic diagram illustrating an information interaction method between an LMF and a base station according to an embodiment.

FIG. 2B shows that, the LMF directly exchanges various information for PBS positioning (for example, including but not limited to a set of PRS configurations) with the UE through an LPP message specified by an LPP protocol and a transparent transmission of the base station.

Figure 2C:
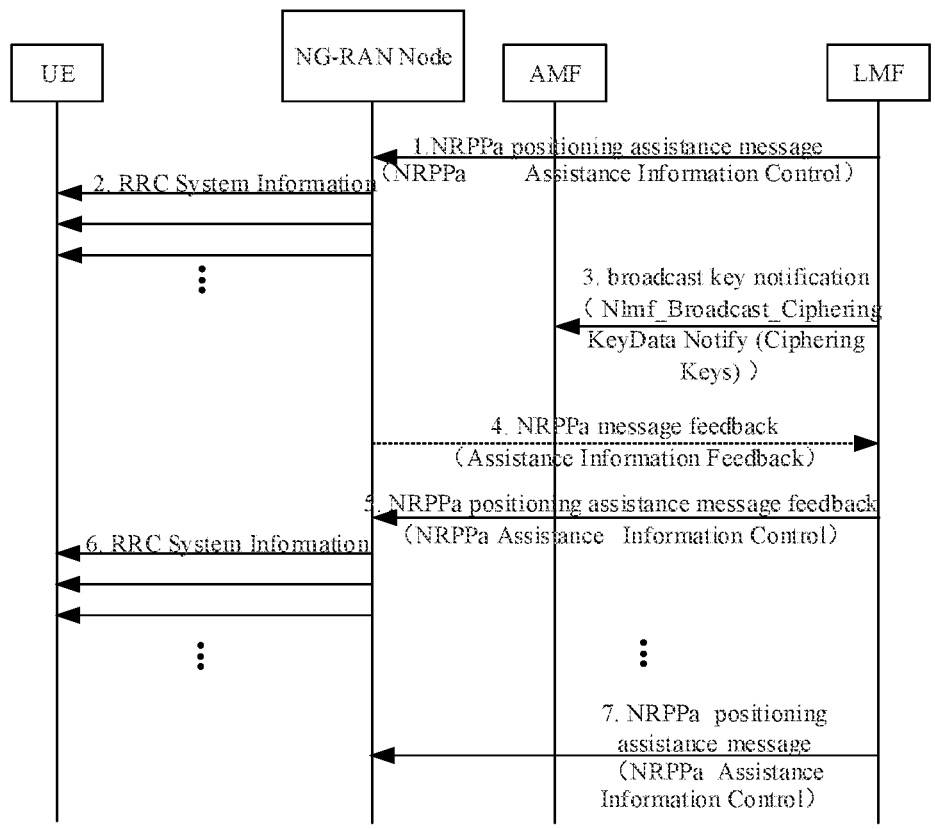
FIG. 2C is a schematic diagram illustrating an information interaction method between an LMF, an authentication management function (AMF), a base station and a UE according to an embodiment.

5G R16 introduces a variety of positioning technologies, which can realize positioning of the UE. For some of these positioning technologies, the network needs to provide positioning assistance information to the UE. For example, as shown in FIG. 2C, the LMF provides the positioning assistance information to the UE through an LPP message. In addition, the LMF can also send the positioning assistance information to the base station through the NRPPa message, and then the base station sends it to the UE through the system message, as shown in FIG. 2C, which may include the followings.

1. The LMF sends a NRPPa positioning assistance message (NRPPa Assistance Information Control) to a wireless network access node such as the base station, for example, the wireless network access node may be the next generation-radio access network (NG-RAN) node such as the 5G base station shown in FIG. 2C.

2. The NG-RAN node sends RRC system information to the UE.

3. The LMF sends a broadcast key notification ((Nlmf_Broadcast_CipheringKeyData Notify (Ciphering Keys))) to an access management function (AMF). The Ciphering Keys are keys used for encryption of information broadcast by the base station.

4. The NG-RAN node sends an NRPPa message feedback (Assistance Information Feedback) to the LMF to feed back whether the information sent by the LMF is correctly received. But this step is an optional step.

5. The LMF sends an NRPPa positioning assistance message (NRPPa Assistance Information Control) to the wireless network access node such as the base station.

6. The RRC system information is sent.

7. The LMF sends an NRPPa positioning assistance message (NRPPa Assistance Information Control) to the wireless network access node such as the base station.

In related technologies, the PRS configuration of R16 is a static configuration. However, considering the UE's positioning precision requirement and system overheads, a dynamic PRS configuration can meet the high-precision positioning requirement while reducing the system overhead, so that it is required to implement dynamic positioning broadcast auxiliary information.

Figure 3A:
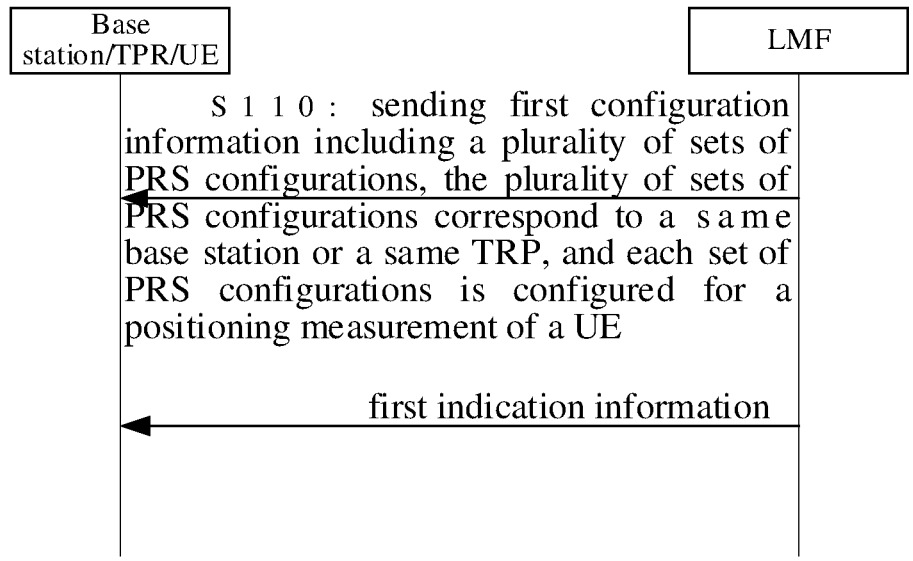
FIG. 3A is a flowchart illustrating a method for processing a PRS configuration according to an embodiment.

As illustrated in FIG. 3A, the embodiment of the present disclosure provides a method for processing a PRS configuration, which is applied in an LMF and includes the followings.

At block S110, first configuration information including a plurality of sets of PRS configurations is sent. The plurality of sets of PRS configurations correspond to a same base station or a same TRP and each set of PRS configurations is used for a positioning measurement of the UE.

In this way, one base station can have a plurality of sets of alternative TPS configurations, or, one TRP has a plurality of sets of alternative TPS configurations.

The first configuration information may be sent by the LMF to the base station or TPR, or may be transparently transmitted to the UE through the base station or TRP. If it is sent to the base station or TPR, the first configuration information can be carried in an NRPPa message. If the LMF directly sends the first configuration information to the UE, the first configuration information is carried in an LPP message.

The set of PRS configurations may include at least one of the followings.

PRS resource configuration, which is configured to indicate a resource location of the positioning reference signal.

PRS measurement mode configuration, which is configured to configure measurement modes of the PRS, including but not limited to: at least one of a Downlink-Time Difference of Arrival (DL-TDOA) mode, an Uplink-Time Difference of Arrival (UL-TDOA) mode, a Downlink-Arrival of Angle (DL-AOA) mode, and an Enhanced Cell-IDentity positioning method (E-CID).

Measurement parameter configuration, which includes but is not limited to: Position Reference Signals-Reference Signal Receiving Power (PRS-RSRP), Position Reference Signals-Reference Signal Time Difference (PRS-RSTD).

Positioning service quality requirement configuration, which includes but is not limited to: positioning precision and/or positioning delay.

Since a plurality of sets of PRS configurations are sent simultaneously, when performing the positioning, the set of PRS configurations that meets a current positioning requirement can be selected to ensure that the positioning requirement are met while reducing signaling overheads as much as possible.

In some embodiments, different sets of PRS configurations meet different positioning precisions; and/or, different sets of PRS configurations require different positioning overheads.

Due to a plurality of sets of PRS configurations, the base station and UE can select a set of PRS configurations suitable for a current positioning requirement when performing the positioning measurement.

The positioning precision is determined by a positioning distance, and the positioning precision includes the followings. Some positioning precisions require positioning to the level of 10 meters, some positioning precisions require positioning to the level of meters, and some positioning precisions require positioning to the level of decimeters or centimeters.

The positioning precision is determined by a signal quality of the PRS, and the positioning accuracy may include the followings. The accuracy of a received power or a received quality of the PRS requires a large decibel level or 0.1 decibel level, etc.

The positioning overhead includes but is not limited to the followings.

Resource overhead, for example, the overhead of time-frequency resources for sending and receiving the PRS.

Signaling overhead. There is signaling overhead during sending and receiving of the PRS and reporting of positioning results.

Power consumption, for example, if the power to transmit the PRS is larger, the power consumption is larger.

For example, different sets of PRS configurations are different in at least one of the followings: a sending period of a PRS; a sending bandwidth of the PRS; a sending resource of the PRS.

The greater the sending period, the greater the time interval between two consecutive PRS transmissions.

The larger the sending bandwidth of the PRS, the larger the resources occupied in the frequency domain to transmit the PRS once.

The sending resource of the PRS includes but is not limited to a time domain resource and/or a frequency domain resource.

For example, for a measurement accuracy of the positioning measurement, a greater number of sending PRSs or more resources may be required. In order to reduce the signaling overheads, a smaller number of sending PRSs or less resources may be required. In short, a set of PRS configurations for the positioning measurement can be selected from the plurality of sets of candidate PRS configurations according to a positioning requirement of the current positioning or the current time period.

When performing the positioning measurement, the base station sends the PRS, the UE receives the PRS, and the UE realizes the positioning of the UE according to a result of receiving the PRS.

In some embodiments, sending the first configuration information including a plurality of sets of PRS configurations includes: sending a broadcast assistance message including the first configuration information to a base station or a TPR; and/or, sending a positioning assistance message including the first configuration information to a UE.

The LMF can indicate to the base station or TPR or UE which set of PRS configurations is currently used for positioning according to the positioning requirement of the UE currently to be positioned in combination with the positioning requirement that can be met by each set of PRS configurations in the plurality of sets of PRS configurations currently sent. For example, the method further includes: sending first indication information, in which the first indication information indicates to select a set of PRS configurations for positioning from the plurality of sets of PRS configurations For example, if the first indication information is sent through an LPP message, the first indication information is configured to instruct the UE to select a set of PRS configurations for the positioning measurement from the plurality of sets of PRS configurations. If the first indication information is sent through an NRPPa message, the first indication information is configured to instruct the base station or the TPR to select a set of PRS configurations for the positioning measurement from the plurality of sets of PRS configurations.

In this case, in an embodiment, sending the first indication information includes: sending the first indication information to the base station or the TRP through a broadcast assistance message.

In another embodiment, the first indication information is sent to the UE through a positioning request message, in which the positioning request message further carries a trigger command for triggering positioning of the UE.

In some other embodiments, the LMF not only sends the first indication information to the base station or the TPR, but also sends the first indication information to the UE at the same time.

The first indication information that is instructed to the base station or the TPR is carried in the NRPPa message. The first indication information to the UE is carried in the LPP message.

In some embodiments, the method further includes sending second configuration information including a reconfiguration. The second configuration information includes: at least one set of updated PRS configurations, or second indication information. The second indication information indicates at least one set of PRS configurations to be updated.

If the second configuration information can directly include the updated set of PRS configurations, after receiving the set of PRS configurations, the base station can directly use the set of PRS configurations in the second configuration information to replace the (i.e., invalid) set of PRS configurations to be updated.

In some embodiments, the second configuration information may be referred to as reconfiguration information.

If the second configuration information only carries the second indication information, the second indication information may indicate how to update one or more sets of PRS configurations previously configured according to the first configuration information. For example, the second indication information carries an offset of the set of PRS configurations before and after the updating.

For example, for the set of PRS configurations 1, the period before the updating is A; after the updating, it is B. In this case, the second indication information may include the offset of B relative to A.

The method further includes sending a broadcast assistance message including the second configuration information to the base station or the TPR.

The second configuration information may also be sent through the broadcast assistance message. In this way, the base station or the TPR can receive the broadcast assistance information through the NRPPa message with the LMF.

For example, the method also includes: receiving confirmation information of the second configuration information, in which the confirmation information is configured to indicate that the second configuration information is determined to be received.

Receiving the confirmation message of the second configuration information includes: receiving the NRPPa message including the confirmation information sent by the base station or the TRP.

By sending the confirmation information, the base station or the TRP informs the LMF that the second configuration information is currently received or that the set of PRS configurations in the base station has been updated and the second configuration information is received.

In some embodiments, the method further includes: receiving third indication information reported by the base station or the TRP, in which the third indication information indicates the set of PRS configurations for positioning selected by the base station or the TPR from the plurality of sets of PRS configurations.

The base station or the TRP can compare a load of each set of PRS configurations for the positioning measurement or an impact of each set of PRS configurations on the wireless environment according to its current load and/or wireless environment, and can select one or more sets of PRS configurations suitable for the current load condition and/or wireless environment as recommended PRS configurations, and then report the third indication information to the LMF. After receiving the third indication information, the LMF may determine a set of PRS configurations for the current positioning according to the third indication information. The current positioning here includes but is not limited to: the current positioning and/or one or more positionings within the current time period.

For example, the LMF may send the first indication information to the base station according to the third indication information. The set of PRS configurations for positioning indicated in the first indication information may be the same as or different from one or more sets of the PRS configurations indicated by the third indication information.

For example, receiving the third indication information reported by the base station or the TRP includes: when the first indication information is not sent, receiving the third indication information from the base station or the TRP. The first indication information is sent by the LMF and is configured to indicate the set of PRS configurations for positioning selected from the plurality of sets of PRS configurations.

For example, if the LMF currently has no clear requirement for positioning, the first indication information may not be sent, or the LMF may receive the third indication information sent by the base station or the TPR when the first indication information has not been sent yet.

Subsequently, the LMF may send the first instruction information according to the third instruction information. Or, when the LMF agrees that the set of PRS configurations recommended by the base station is used for positioning, it can notify the base station through sending of feedback information.

For example, the feedback information may be confirmation information, and the confirmation information is configured to indicate that the set of PRS configurations recommended by the base station or the TPR is agreed to be used for positioning.

For another example, the feedback information may be denial information, and the denial information indicates that the LMF does not agree with the set of PRS configurations suggested by the base station or the TPR through the third indication information. In this case, the LMF can continue to send the first indication information to specifically indicate the set of PRS configurations that the LMF wants the base station or TPR to use.

Figure 3B:
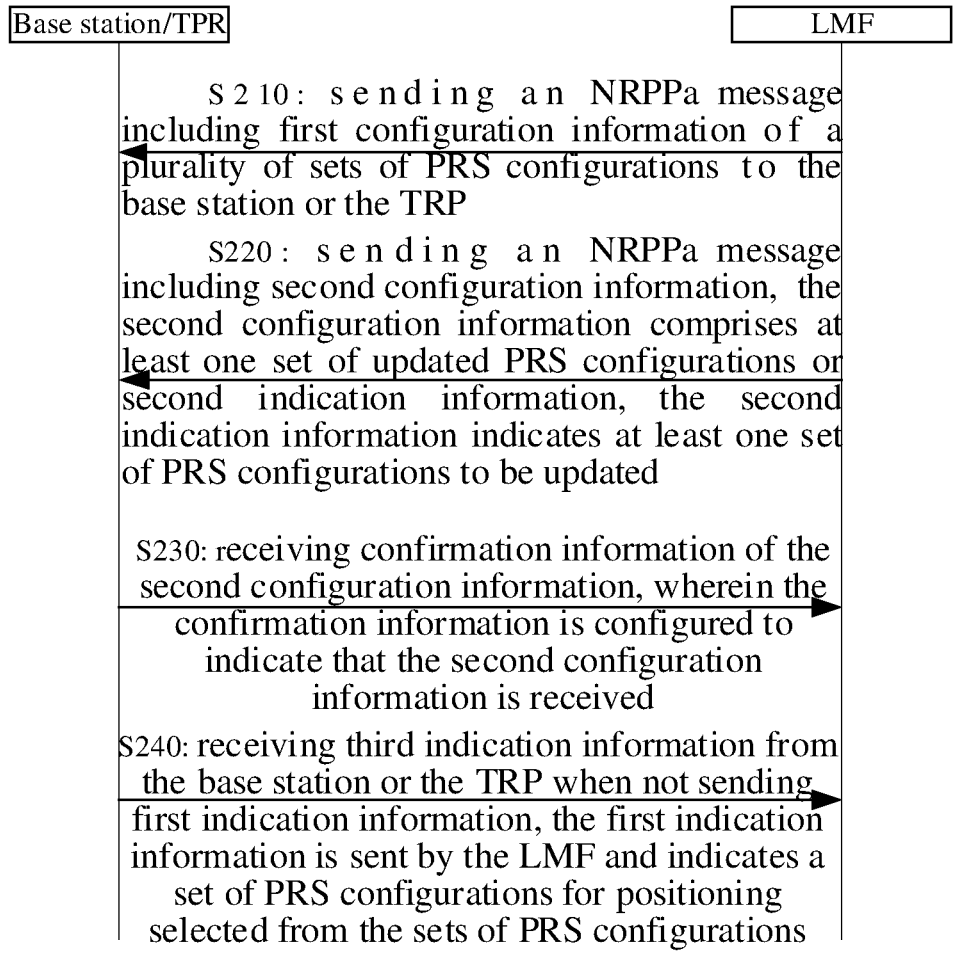
FIG. 3B is a flowchart illustrating a method for processing a PRS configuration according to an embodiment.

As illustrated in FIG. 3B, the embodiment provides a method for processing a PRS configuration including the followings.

At block S210, an NRPPa message is sent to a base station or a TPR. The NRPPa message carries first configuration information with a plurality of sets of PRS configurations. The plurality of sets of PRS are configured as a configuration of a same base station, or the plurality of sets of PRS are configured as a configuration of a same TPR.

Different sets of PRS configurations meet different positioning precisions; and/or, different sets of PRS configurations require different positioning overheads.

Different sets of PRS configurations are different in at least one of the followings: a sending period of a PRS; a sending bandwidth of the PRS; a sending resource of the PRS.

In some embodiments, the NRPPa message received by the base station or the TRP may also include first indication information in addition to the first configuration information. The first indication information indicates to the base station or the TPR the set of PRS configurations for the current positioning in the plurality of sets of PRS configurations.

Of course, in some embodiments, the first indication information and the first configuration information may be sent in a same NRPPa message, which reduces the number of interactions between the LMF and the base station or between the LMF and the TRP.

In some embodiments, the first indication information and the first configuration information may be sent in different NRPPa messages.

For example, if the LMF does not determine the first indication information when sending the first configuration information, the first configuration information and the first indication information are respectively sent through two NRPPa messages.

As illustrated in FIG. 3B, in some embodiments, the method further includes the followings.

At block S220, an NRPPa message including second configuration information is sent. The second configuration information includes: at least one set of updated PRS configurations, or second indication information. The second indication information indicates at least one set of PRS configurations to be updated.

In some embodiments, as illustrated in FIG. 3B, the method further includes the followings.

At block S230, confirmation information of the second configuration information is received. The confirmation information is configured to indicate that the second configuration information is determined to be received.

In some embodiments, as illustrated in FIG. 3B, the method further includes the followings.

At block S240, when the first indication information is not sent, third indication information is received from the base station or the TRP. The first indication information is sent by the LMF, and is configured to indicate the set of PRS configurations for positioning selected from the plurality of sets of PRS configurations.

As illustrated in FIG. 3D, the embodiment provides a method for processing a PRS configuration including the followings.

At block S310, positioning assistance information is sent to the UE. The positioning assistance information is carried by an LPP message, and the positioning assistance information carries first configuration information with a plurality of sets of PRS configuration, and the plurality of sets of PRS configurations correspond to a same base station or a same TRP, and each set of PRS configurations is configured for positioning measurement of the UE.

The LPP message here is transparently transmitted from the LMF to the UE through the base station.

In some embodiments, the positioning assistance information includes a cell identification for positioning measurement and/or a base station identification for positioning measurement, and, resource location information of a positioning reference signal for positioning measurement.

In some embodiments, the cell identification may be an identification of the last resided serving cell or a neighboring cell of the last resided serving cell.

In other embodiments, the base station identification may be an identification of a base station of a serving cell where the UE resides last, or an identification of a base station of a neighboring cell of the last resided serving cell.

Through the cell identification and/or the base station identification, the UE can know a measurement object. When performing the positioning measurement, the PRS sent by the cell or the base station is measured. Therefore, when the UE performs the positioning measurement, it needs to know resource location information of the PRS. The resource location information indicates a time-frequency resource for sending the PRS.

Different sets of PRS configurations meet different positioning precisions; and/or, different sets of PRS configurations require different positioning overheads.

Different sets of PRS configurations are different in at least one of the followings: a sending period of a PRS; a sending bandwidth of the PRS; a sending resource of the PRS.

Figure 3C:
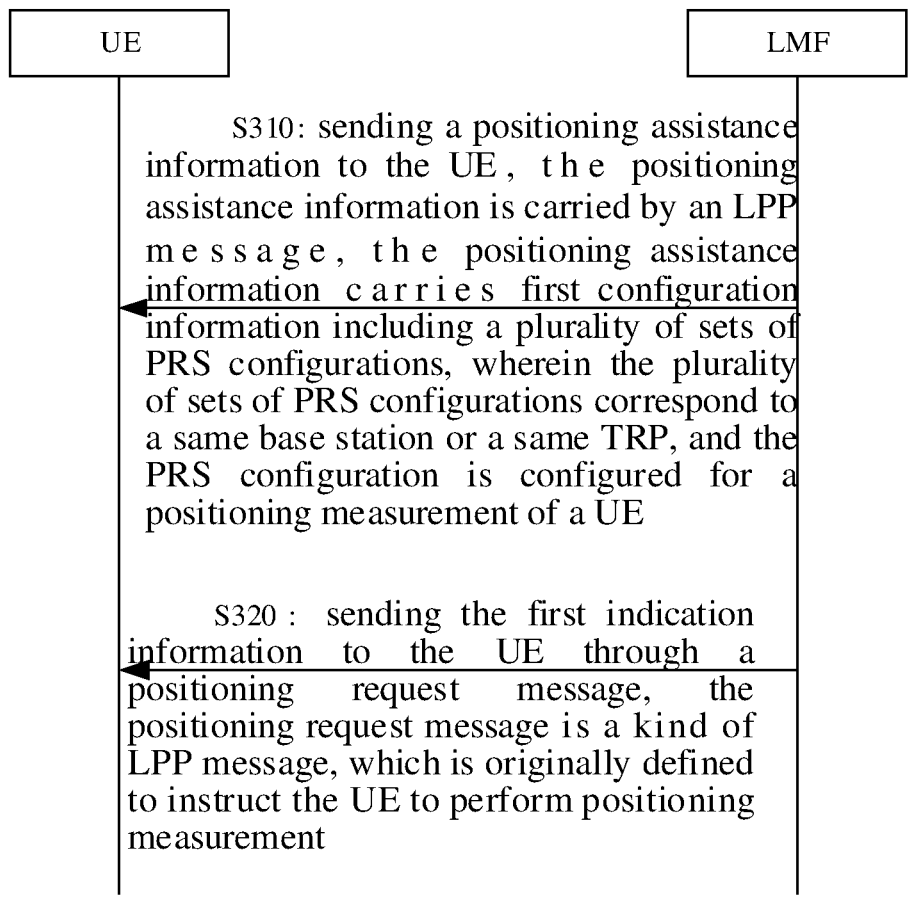
FIG. 3C is a flowchart illustrating a method for processing a PRS configuration according to an embodiment.

In some embodiments, as illustrated in FIG. 3C, the method further includes the followings.

At block S320, the first indication information is sent to the UE through a positioning request message. The positioning request message is a type of LPP message, which was originally intended to instruct the UE to perform positioning measurement.

For example, after receiving the positioning request message, the UE may perform the positioning measurement according to the set of PRS configurations and report a positioning result.

In the embodiment of the present application, since the UE receives a plurality of sets of PRS configurations of one base station or one TRP from the LMF, the positioning request message also carries first indication information indicating which set of PRS configurations is used for current positioning. In this way, the positioning request message not only trigger the UE to perform the positioning measurement, but also informs the UE based on which set of PRS configurations to perform the positioning measurement.

For example, the positioning measurement of the UE includes but is not limited to: the UE receiving the PSR sent by the base station or the TPR on a corresponding time-frequency resource according to the set of PRS configurations indicated by the first indication information.

Figure 4A:
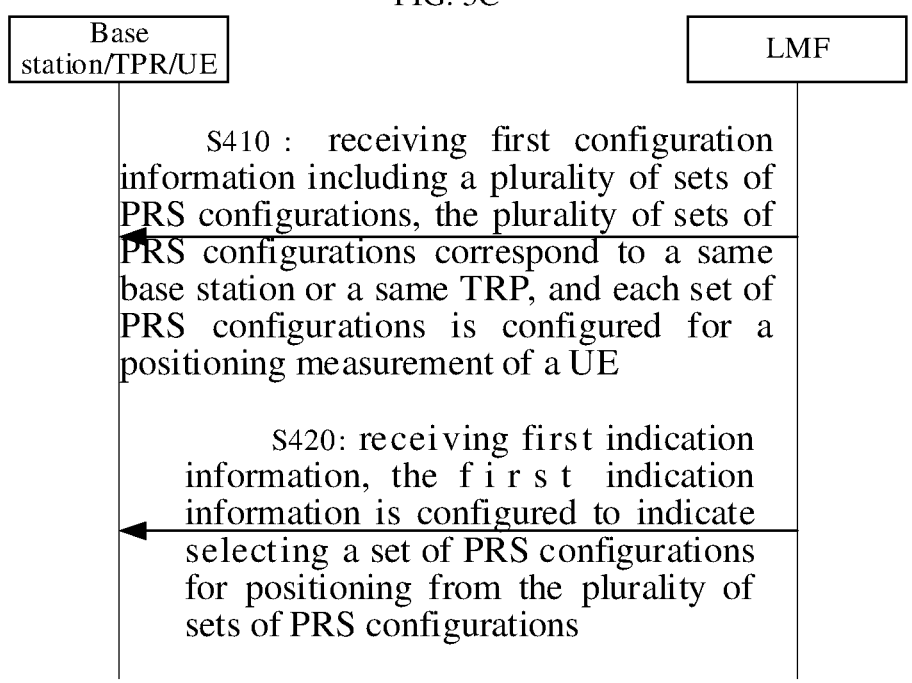
FIG. 4A is a flowchart illustrating a method for processing a PRS configuration according to an embodiment.

As illustrated in FIG. 4A, the embodiment of the present disclosure provides a method for processing of a PRS configuration, which includes the followings.

At block S410, first configuration information including a plurality of sets of PRS configurations is received. The plurality of sets of PRS configurations correspond to a same base station or a same TRP, and each set of PRS configurations is configured for positioning measurement of the UE.

The LMF may send the first configuration information including the plurality of sets of PRS configurations. In this way, the base station or the TPR or the UE may receive the plurality of sets of PRS configurations of the same base station or the same TPR.

In some embodiments, the method further includes the followings.

At block S420, first indication information is received. The first indication information is configured to indicate to select a set of PRS configurations for positioning from the plurality of sets of PRS configurations.

In the received plurality of sets of PRS configurations, different sets of PRS configurations meet different positioning precisions; and/or, different sets of PRS configurations require different positioning overheads.

The plurality of sets of PRS configurations are different, including but not limited to: different sets of PRS configurations being different in at least one of the followings: a sending period of a PRS; a sending bandwidth of the PRS; a sending resource of the PRS.

The direct communication between the LMF and the base station or the TPR may comply with the NRPPa protocol, while the communication between the LMF and the UE may comply with the LPP protocol. By distinguishing different receivers corresponding to the two protocols, and examples are given for illustration below.

Figure 4B:
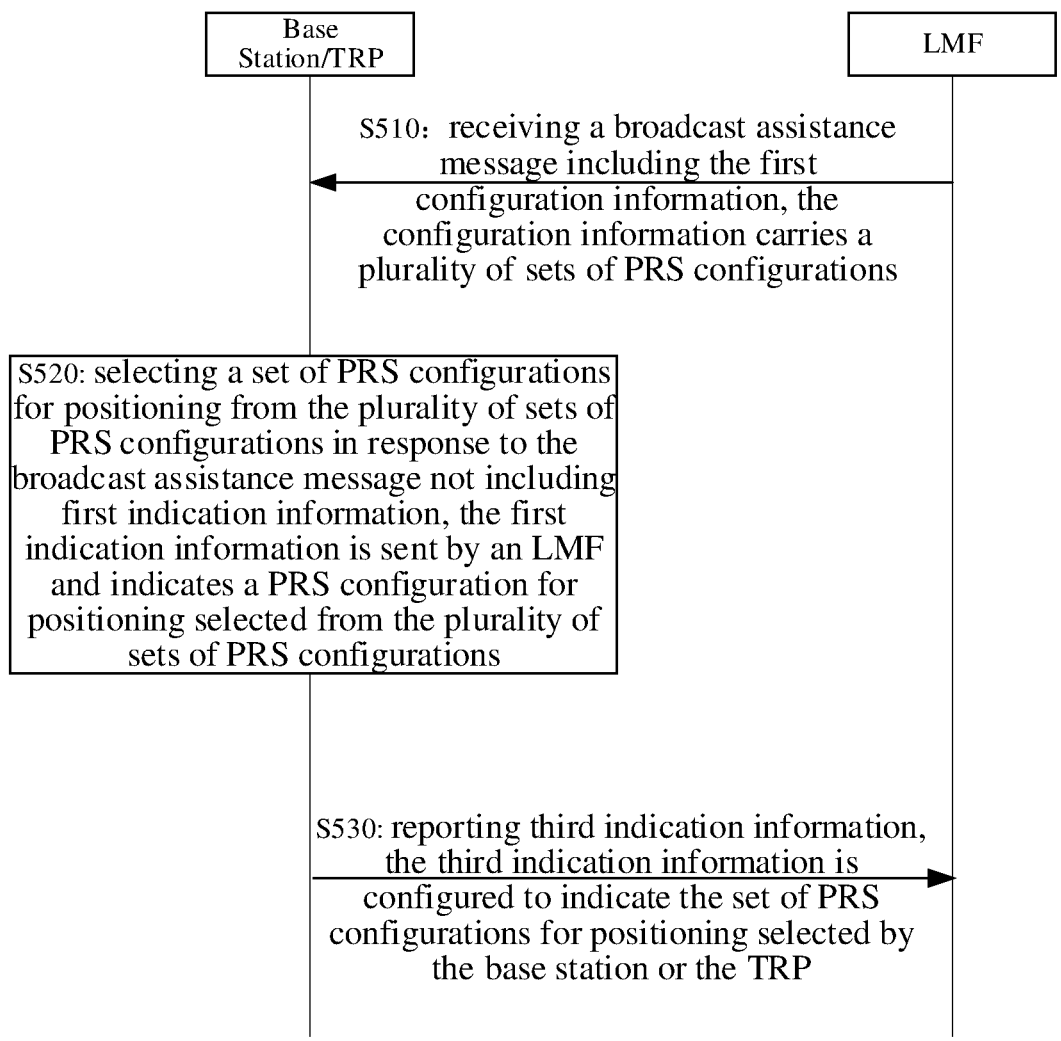
FIG. 4B is a flowchart illustrating a method for processing a PRS configuration according to an embodiment.

As illustrated in FIG. 4B, the embodiment of the present disclosure provides a method for processing a PRS configuration applied to a base station or a TRP, including the followings.

At block S510, a broadcast assistance message including first configuration information is received, and a plurality of sets of PRS configurations are carried by the first configuration information. Multiple sets of PRS configurations in the plurality of sets of PRS configurations belong to a same base station or belong to a same TRP. For example, the first configuration information has M sets of PRS configurations, N1 sets belong to base station 1, and N2 sets belong to base station 2. Both N1 and N2 are positive integers equal to or greater than 2. The plurality of sets of PRS configurations of different base stations or different TPRs can be partially the same or can be the same completely.

For example, if a total of S wireless network access nodes such as the base station and the TPR receive the NRPPa message, the NRPPa message carries the first configuration information of M sets of PRS configurations. These M sets belong to each wireless network access node, and each base station or each TPR has M sets of PRS configurations. Of course, it is also possible that multiple sets of the M sets belong to some of the wireless network access nodes, and the other multiple sets belong to the others of the wireless network access nodes.

In short, the first configuration information carried in the broadcast assistance message sent by the LMF to the base station or the TRP may include: a plurality of sets of PRS configurations for one base station or a plurality of sets of PRS configurations for one TPR. In this way, the first configuration information carried in the broadcast assistance message received by a single base station or a single TRP may be a plurality of sets of PRS configurations configured by the LMF for itself.

Different sets of PRS configurations have different positioning precisions and/or different positioning overheads. When the base station cooperates with the UE to perform positioning measurement of the UE, the base station can select a set of PRS configurations suitable for the current positioning measurement from a plurality of sets of PRS configurations according to a precision requirement and/or an overhead restriction of the current positioning measurement of the UE, so as to meet the positioning requirements of different positioning measurements, and improve the quality of service (QoS) of positioning measurement, etc.

As illustrated in FIG. 4B, the method further includes the followings.

At block S520, in response to a broadcast assistance message not including first indication information, a set of PRS configurations for positioning is selected from a plurality of sets of PRS configurations. The first indication information is sent by the LMF and is configured to indicate the PRS configuration for positioning selected from the plurality of sets of PRS configurations.

At block S530, third indication information is reported. The third indication information is used to instruct the base station or the TPR to select the set of PRS configurations for positioning.

If the NRPPa message does not include the first indication information, the base station or the TPR determines a set of PRS configurations for positioning by itself, and cooperates with the UE to perform UE positioning.

In this case, the base station or the TPR may report the TPR configuration determined by itself or recommended through the third indication information. The third indication information reported here may also be an NRPPa message.

After the base station or the TRP reports the third indication information, the base station or the TPR may receive the first indication information and/or feedback information sent by the LMF according to the third indication information. In this way, the base station or the TPR may know the set of PRS configurations for current positioning or the set of PRS configurations for positioning within the current time period according to the set of PRS configurations for positioning indicated by the first indication information and/or the feedback information. In some embodiments, the broadcast assistance message also carries the first indication information, and the method further includes: selecting the set of PRS configurations for positioning from the plurality of sets of PRS configurations according to the first indication information.

If any NRPPa message carries the first indication information, the base station or the TPR selects the set of PRS configurations for positioning from a plurality of sets of PRS configurations according to the first indication information. In this case, the base station or the TPR may not need to report the third indication information. If the base station currently needs to cooperate with the UE to perform positioning measurement, it transmits the PRS according to the set of PRS configurations indicated by the first indication information, and forwards a positioning result generated by the base station through the PRS positioning measurement. For example, the positioning result of the UE is sent to the LMF through transparent transmission or non-transparent transmission. The positioning result here includes, but is not limited to: specific location information (for example, latitude and longitude information) and/or a measurement result of the PRS, for example, received power information of the PRS.

Figure 4C:
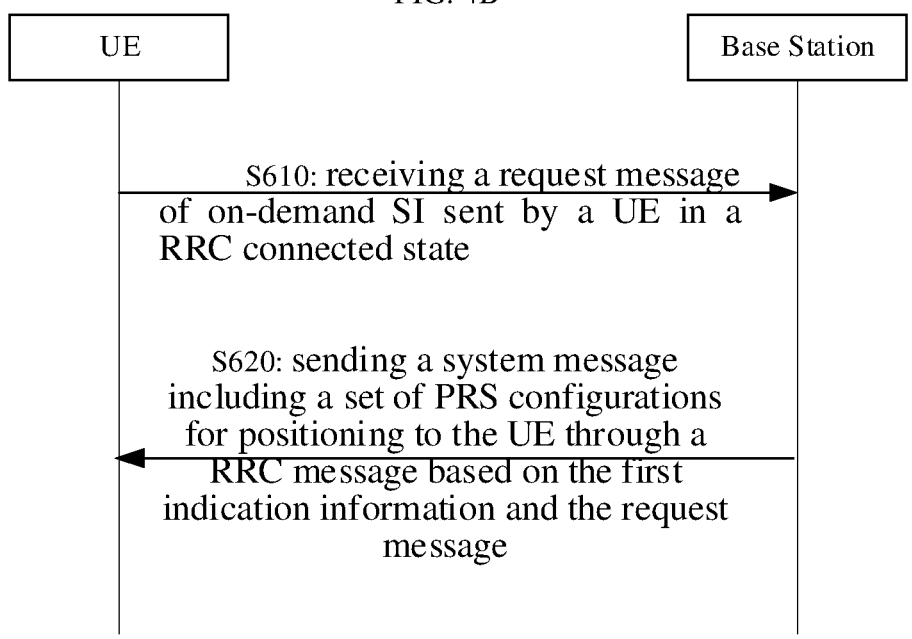
FIG. 4C is a flowchart illustrating a method for processing a PRS configuration according to an embodiment.

In some embodiments, as shown in FIG. 4C, the method further includes the followings.

At block S610, a request message of on-demand system information (SI) sent by the UE in a RRC connected state is received.

At block S620, according to the first indication information and the request message, a system message including a set of PRS configurations for positioning is sent to the UE through a RRC message.

If the base station is in the RRC connected state, the information exchange between the base station or the TPR and the UE is relatively flexible. In order to reduce the signaling overheads, if a request message from the UE is received, the base station or the TPR may send the set of PRS configurations for positioning to the UE through the RRC message by combining the first indication information and the request message.

Figure 4D:
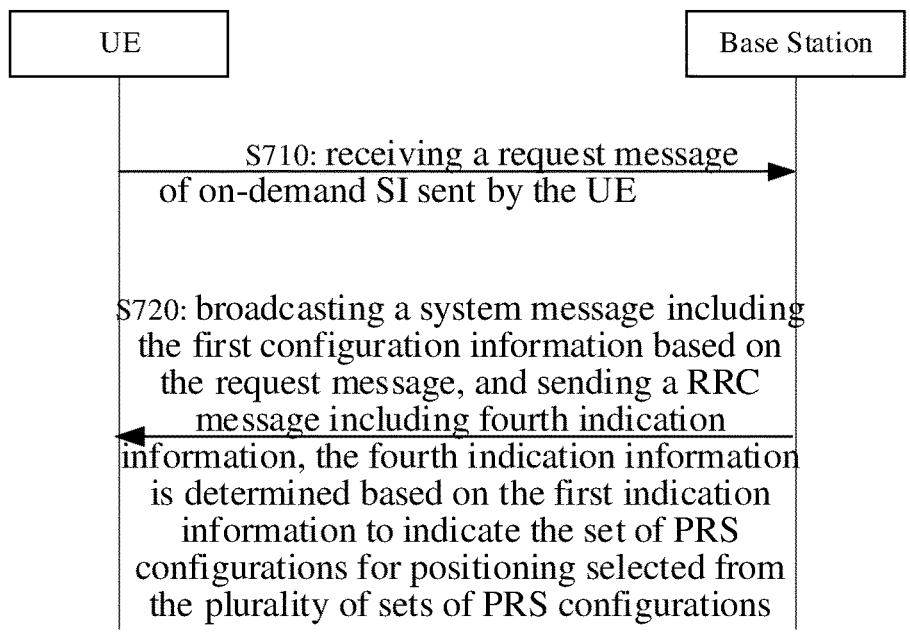
FIG. 4D is a flowchart illustrating a method for processing a PRS configuration according to an embodiment.

In some embodiments, as illustrated in FIG. 4D, the method further includes the followings.

At block S710, a request message of on-demand SI sent by the UE is received.

At block S720, based on the request message, a system message including the first configuration information is broadcast, and a RRC message including fourth indication information is sent. The fourth indication information is determined according to the first indication information, to indicate the set of PRS configurations for positioning selected from the plurality of sets of PRS configurations.

After receiving the request message, the base station or the TPR broadcasts a system message, so that the UE knows the current plurality of sets of PRS configurations of the base station or the TPR by receiving the broadcast system message. The base station or the TPR also sends the fourth indication information through the RRC message. The fourth indication information and the first indication information here both point to the same set of PRS configurations for positioning, but indicate bits in different indication modes, and the IEs that include the fourth indication information and the first indication information are different.

In the embodiment, the UE sending the request message of the on-demand SI may be in the RRC connected state, the RRC idle state, or the RRC inactive state.

In some embodiments, the RRC message includes a first indication IE including the fourth indication information. The fourth indication information is determined according to the first indication information and indicates a set of PRS configurations for positioning selected from the plurality of sets of PRS configurations.

A dedicated first indication IE is introduced in the RRC message. The IE can include a bit sequence. A bit in the bit sequence can correspond to one set of PRS configurations. A bit value of this bit can be used to indicate whether one set of PRS configurations is used for positioning.

In some embodiments, the request message is sent by the UE when the base station or the TPR does not broadcast a system message containing the set of PRS configurations or has broadcast a system message containing the plurality of sets of PRS configurations.

In one embodiment, the UE receives a positioning request message sent by the LMF to trigger the UE to perform positioning measurement, but does not know the set of PRS configurations yet. In this case, the UE may report the request message of the on-demand SI.

In another embodiment, the UE receives a positioning request message sent by the LMF to trigger the UE to perform positioning measurement and also receives the plurality of sets of PRS configurations sent by the base station or the TPR, but currently does not know which set of PRS configurations is used for positioning measurement. In this case, the UE may report the request message of the on-demand SI.

In the foregoing, by reporting the request message of the on-demand SI, the plurality of sets of PRS configurations are requested from the base station or the TPR, or the UE requesting the fourth indication information may be in the RRC connected state, or in the RRC idle state or the RRC inactive state.

In some embodiments, the method further includes: receiving a random access request from UE in the RRC idle state or the RRC inactive state; in response to the random access request including the request message of the first configuration information, broadcasting a system message including the first configuration information, and sending a random access response (RAR) including fifth indication information to the UE in the RRC idle state or the RRC inactive state. The fifth indication information is determined according to the first indication information and indicates the set of PRS configurations for positioning selected from the plurality of sets of PRS configurations.

If the UE is in the RRC idle state or the RRC inactive state, the UE may send the first configuration information and/or the fifth indication information through a random access procedure.

The random access here can be 2-step random access or 4-step random access.

In the embodiment of the present disclosure, for example, the UE carries a request message for requesting assistance information through the message (Msg) A of the 2-step random access. In this way, the base station or the TPR may receive the MsgA, and if it finds that the MsgA carries the request message, it may return a message including the assistance information to the UE with a random access response (such as MsgB).

In the embodiment of the present disclosure, for example, the UE carries a request message for requesting assistance information through the message (Msg) 1 of the 4-step random access. In this way, the base station or the TPR may receive the Msg1, and if it finds that the Msg1 carries the request message, it may return a message including the assistance information to the UE with a random access response (such as Msg2 or Msg4).

For example, the base station carries the assistance information in the random access response (RAR). The MAC RAR of the RAR carries the assistance information.

In some embodiments, for a random access request requesting the assistance information, the random access response may include a random access preamble (RAP) (Identity. ID) identification and the fifth indication information.

In some embodiments, the functions of the fifth indication information and the first indication information are the same, however, the information content of the fifth indication information and the information content of the first indication information may be the same or different. The information formats of the fifth indication information and the first indication information may be the same or different.

In some embodiments, the RAP ID and the fifth indication information may be carried in the same IE, for example, carried in a reserved bit in the IE originally used to include the RAP ID.

In other embodiments, a new IE is added to the RAR or a dedicated IE is used alone to include the fourth indication information. For example, in some embodiments, the RAR includes: a second indication IE, which carries the fifth indication information.

The second indication IE may be a newly added IE in the RAR or a reserved IE in the RAR.

In some embodiments, a new MAC sub protocol data unit (PDU) is added to the RAR to include the fifth indication information.

In some embodiments, the second indication IE carries a configuration identification of the set of PRS configurations for the current positioning. A plurality of communication nodes share the set of PRS configurations identified by the configuration identification, the communication node is a base station and/or a TRP.

Or, the second indication IE carries a node identification of the communication node. The node identification has a correspondence with the set of PRS configurations.

In some embodiments, the aforementioned first indication IE may also include the configuration identification of the set of PRS configurations for the current positioning. A plurality of communication nodes share the set of PRS configurations identified by the configuration identification, the communication node is a base station and/or a TRP; or the first indication IE may also include the node identification of the communication node. The node identification has a correspondence with the set of PRS configurations.

For example, X adjacent base stations share at least one set of PRS configurations. When the set of PRS configurations is used for performing positioning measurement of the UE, the first indication IE and/or the second indication IE can include the configuration identification of the set of PRS configurations. In this case, when the UE receives the configuration identification of the set of PRS configurations, it may consider that multiple base stations or TRPs share the set of PRS configurations for the positioning measurement. For example, the UE completes its own positioning measurement through signal interaction with three base stations or TRPs. In this case, if the first indication IE received by the UE carries a configuration identification of a set of PRS configurations, the UE considers that all three base stations use the set of PRS configurations to send the PRS, so as to perform the positioning measurement.

In some embodiments, the base station identification of the base station or the TRP identification of the TPR has a correspondence with the set of PRS configurations. The set of PRS configurations corresponding to different communication nodes may be the same or different. For example, but not limited to: one base station or TPR has a default set of PRS configurations or a preferential set of PRS configurations. In this case, the base station or the TPR can establish a correspondence with the default set of PRS configurations or the set of preferential PRS configurations. If the default set of PRS configurations or the preferential set of PRS configurations is used, the base station identification or the TRP identification can be carried as the communication identification. In this way, the UE receives the first indication IE including the communication identification and determines the node identification of each base station or TPR to determine which set of PRS configurations to use for the positioning measurement according to indication information of the correspondence sent by the base station or the TPR in advance.

In another embodiment, the first indication TE and/or the second indication IE carries both the node identification and the configuration identification. The node identification is used to indicate the base station and/or the TPR participating in the positioning measurement of the UE. The configuration identification can be used to indicate the set of PRS configurations that the base station or the TPR may use.

In some other embodiments, the first indication TE and/or the second indication IE carries both the node identification and the configuration identification, and carries the node identification and the configuration identification in a corresponding mode, i.e., one node identification corresponds to one configuration identification. For example, (TRP ID1, PRS configuration ID1); (TRP ID2, PRS configuration ID3). TRP ID1 is the identification of TRP1. TRP ID2 is the identification of TRP. PRS configuration ID1 is the identification of PRS configuration 1. PRS configuration ID3 is the identification of PRS configuration 3. In this way, TPR 1 indicated by the first indication IE uses PRS configuration 1, and TRP2 uses PRS configuration 3.

In some embodiments, the method further includes: receiving a broadcast assistance message including second configuration information, in which the second configuration information includes at least one set of updated PRS configurations, or second indication information which indicates at least one set of PRS configurations to be updated; and updating at least one set of PRS configurations according to the second configuration information.

In case that the LMF sends the first configuration information through the broadcast assistance information, when the LMF needs to update one or more sets of PRS configurations, it may directly send the updated set of PRS configurations through the second configuration information, or send the second indication information for updating one or more sets of PRS configurations.

The second indication information may be information indicating how to update one or more sets of PRS configurations.

In some embodiments, the method further includes: in response to receiving the second configuration information, reporting an NRPPa message including confirmation information, in which the confirmation information is configured to indicate confirmation of receipt of the second configuration information.

The confirmation information is used to indicate that the second configuration information sent by the LMF is received, indicating that the base station or the TPR receives the second configuration information and updates at least one set of PRS configurations currently.

In some embodiments, the broadcast assistance message includes: an NR downlink measurement assistance information element (IE).

An NR downlink positioning reference signal assistance information in the NR downlink measurement assistance IE includes the first configuration information.

In the embodiment, the NR downlink measurement assistance IE in the broadcast assistance message is used to include the first configuration information. For example, a reserved bit or a reserved sequence of the NR downlink measurement assistance IE may be used to include the first configuration information.

The embodiment provides a positioning measurement method, including: determining a set of PRS configurations for positioning measurement, in which the set of PRS configurations for positioning measurement is selected from a plurality of sets of PRS configurations of a base station or a TRP; receiving a PRS according to the set of PRS configurations and obtaining a positioning result; and reporting the positioning result.

In some embodiments, the method further includes: receiving first configuration information of the plurality of sets of PRS configurations of the base station or the TRP; and receiving fourth instruction information.

Determining the set of PRS configurations for positioning measurement includes: selecting the set of PRS configurations for positioning measurement from the plurality of sets of PRS configurations of the base station or the TRP according to the fourth indication information.

In another embodiment, determining the set of PRS configurations for positioning measurement includes: receiving the set of PRS configurations for positioning measurement selected from the plurality of sets of PRS configurations and sent by the base station or the TPR.

In some embodiments, the method further includes: receiving a location request message sent by the LMF; in response to not receiving the set of PRS configurations of the base station or the TPR or receiving a system message including the first configuration information when receiving the positioning request message, sending a request message, in which the request message is configured to request the set of PRS configurations.

In some embodiments, the method further includes: in response to not receiving the PRS configuration of the base station or the TPR or receiving the system message including the first configuration information when receiving the positioning request message, sending a request message of on-demand SI; and receiving a system message broadcast based on the request message, in which the system message carries the plurality of sets of PRS configurations of one base station or multiple TPRs.

In this case, receiving the fourth indication information includes: receiving a RRC message including the fourth indication information.

The RRC message includes: a first indication IE including the fourth indication information, in which the fourth indication information is determined according to the first indication information, and indicates the set of PRS configurations for positioning selected from the plurality of sets of PRS configurations.

In some embodiments, the RRC message includes the first indication IE. The first indication IE carries the fourth indication information.

In some embodiments, the first indication IE carries the configuration identification of the set of PRS configurations for the current positioning. A plurality of communication nodes share the set of PRS configurations identified by the configuration identification, the communication node is a base stations and/or a TRP. Alternatively, the first indication IE carries the node identification of the communication node, in which the node identification has a correspondence with the set of PRS configurations.

In another embodiment, the method further includes: receiving a location request message sent by the LMF; in response to not receiving the set of PRS configurations of the base station or the TPR or receiving the system message containing the first configuration information when receiving the positioning request message, sending the request message of the on-demand SI.

Determine the set of PRS configurations for positioning measurement includes: receiving a system message including the set of PRS configurations for positioning measurement that is sent according to the request message and the first indication information.

In an embodiment, if the UE is in the RRC idle state or the RRC inactive state, the UE may send the request message through a random access request, in which the request message is configured to request the first configuration information of the set of PRS configurations, may receive a system message including the first configuration information broadcast based on the request message, and receive a random access response sent based on the request message carried in the random access request, in which the random access response carries fifth indication information.

Determining the set of PRS configurations for positioning measurement includes selecting the set of PRS configurations for positioning from the plurality of sets of PRS configurations of one base station or one TRP according to the random access response.

The RAR includes a second indication IE including the fifth indication information.

In some embodiments, the second indication IE carries a configuration identification of the set of PRS configurations for the current positioning. A plurality of communication nodes share the set of PRS configurations identified by the configuration identification, the communication node is a base station and/or a TRP.

Or, the second indication IE carries the node identification of the communication node, in which the node identification has a correspondence with the set of PRS configurations.

In some embodiments, the method for processing first configuration information of PRSP further includes: receiving a broadcast assistance message including second configuration information, in which the second configuration information includes at least one set of updated PRS configurations, or second indication information indicating at least one set of PRS configurations to be updated, and updating at least one set of PRS configurations according to the second configuration information.

In any of the above embodiments, the first indication IE may be an IE newly added in an RRC message or the RAR, or may be any IE that already exists in the related art but reserves a reserved bit.

Figure 4E:
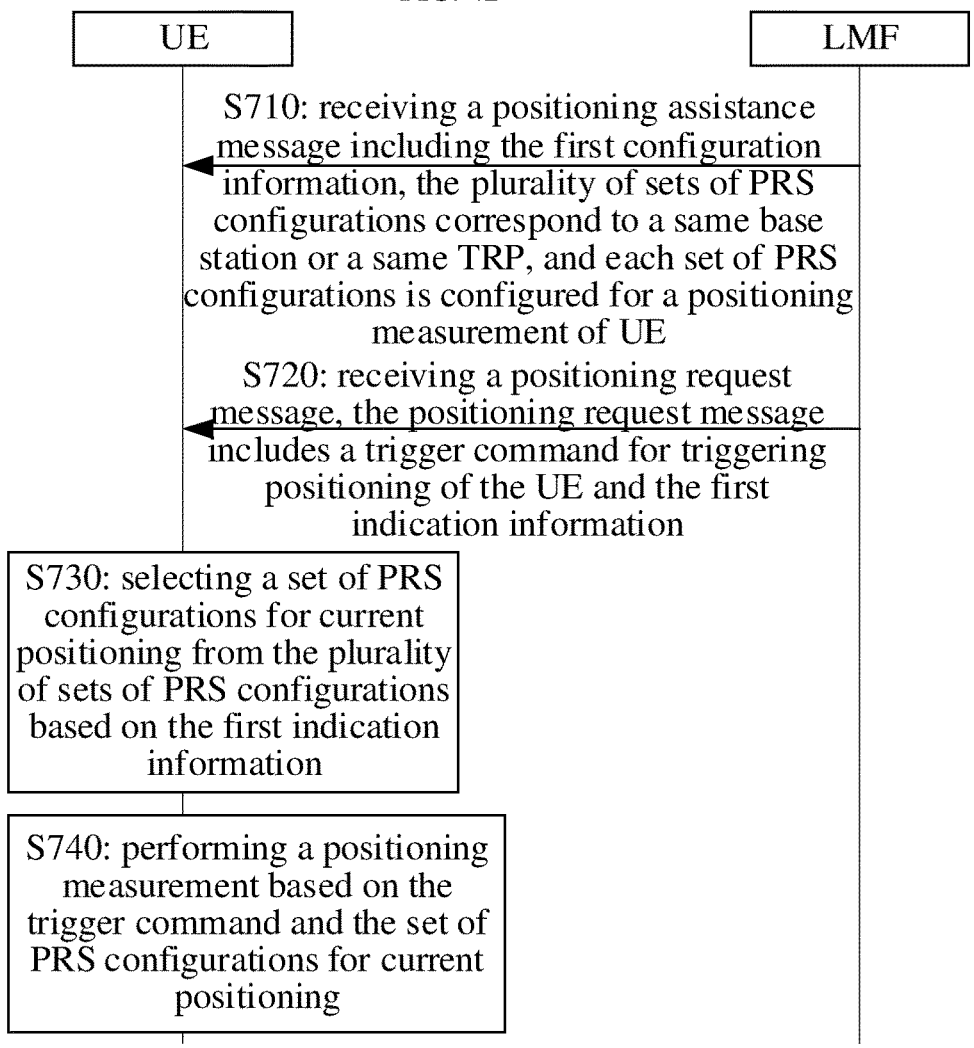
FIG. 4E is a flowchart illustrating a method for processing a PRS configuration according to an embodiment.

As illustrated in FIG. 4E, the embodiment of the present disclosure provides a method for processing a PRS configuration, which is applied to a UE and includes the followings.

At block S710, a positioning assistance message including first configuration information is received. A plurality of sets of PRS configurations correspond to one base station or one TRP, and each set of PRS configurations is configured for positioning measurement of the UE.

The positioning assistance message may be an LPP message sent according to the LPP protocol, which is directly transmitted by the LMF to the UE. After receiving the positioning assistance message sent by the LMF, the base station transparently transmits it to the UE.

In this way, the UE can directly receive the first configuration information including the plurality of PRS configurations of one base station or one TRP from the LMF.

In some embodiments, the method for processing first configuration information of a PRS further includes the followings.

At block S720, a positioning request message is received. The positioning request message includes: a trigger command for triggering UE positioning and first indication information.

At block S730, according to the first indication information, a set of PRS configurations for this positioning is selected from the plurality of sets of PRS configurations.

At block S740, positioning measurement is performed according to the trigger command and the set of PRS configurations for the current positioning.

In some embodiments, the location request message includes a third indication IE including the first indication information.

The plurality of sets of PRS configurations are sent. When the UE is triggered to make a positioning request, the positioning request message carries the first indication information, thereby indicating to the UE which set of the plurality of sets of PRS configurations is used for positioning measurement.

In some embodiments, the third indication IE carries: a configuration identification of the set of PRS configurations for positioning. A plurality of communication nodes share the set of PRS configurations identified by the configuration identification. The communication node is a base station and/or a TRP. Or, the third indication IE carries the node identification of the communication node, in which different node identifications correspond to different PRS configurations.

In some embodiments, the positioning assistance message includes a provide assistance data IE, in which the provide assistance data IE carries the first configuration information.

With the method provided in the embodiment, the network can update the set of PRS configurations, and the set of PRS configurations updated by the network can be quickly notified to the UE, thus realizing a dynamic PRS configuration, meeting different positioning requirements, reducing system overheads, and improving a resource utilization. The solution provided by the embodiment may be described as follows.

Step 1: The network (LMF) sends positioning assistance information (LPP message) to the UE. The positioning assistance information pre-configures a plurality of sets of downlink PRS configurations of multiple TRPs for the UE. The set of downlink PRS configurations here is one of the sets of PRS configurations provided in any of the foregoing embodiments.

For example, taking OTDOA positioning as an example, there is an NR-DL-TDOA-ProvideAssistanceData IE in the provide assistance data (ProvideAssistanceData) IE in the positioning assistance (LPP Provide Assistance Data) message.

NR-DL-TDOA-ProvideAssistanceData IE contains NR-DL-PRS-AssistanceDataPerTRP IE. In this IE, the plurality of sets of downlink PRS configurations of multiple TRPs can be configured for the UE.

The foregoing plurality of sets of downlink PRS configurations can meet different positioning requirements and positioning precisions of the UE. For example, the plurality of sets of downlink PRS configurations include different PRS sending periods, different PRS sending bandwidths, different PRS resource IDs and so on.

Step 2: The network sends a positioning request message to the UE, and the positioning request message indicates one of the plurality of sets of PRS configurations in the positioning assistance message mentioned in step 1.

For example, a new IE can be added and different values of the IE are used to indicate different PRS configurations, that is, all TRPs in the positioning assistance information use the same set of PRS configurations. Or, add IE a new IE can be added, which includes each TRP ID, and for each TRP ID, different values indicate different sets of PRS configurations.

Step 3: After the UE receives the positioning request message sent by the network, it combines the positioning assistance information sent by the network to the UE to determine the set of PRS configurations currently used by the network, thereby completing the positioning measurement.

Step 4: When the network needs to reconfigure the set of downlink PRS configurations, the network (LMF) sends a downlink PRS reconfiguration request (corresponding to the second configuration information in the foregoing embodiments) to all base stations/TRPs in the aforementioned assistance information sent to the UE.

The reconfiguration request includes the first configuration information of the PRS, and the first configuration information of the PRS is one of multiple sets of PRS configurations in the aforementioned positioning assistance information.

After receiving the aforementioned PRS reconfiguration request sent by the network (LMF), the base station/TRP sends a confirmation message (NRPPa message) to the network, and sends the PRS according to the received set of PRS configurations.

The network indicates the updated set of downlink PRS configurations of the network in the positioning request sent to the UE.

In the embodiment, step 1, step 2, step 3, and step 4 only distinguish different steps, and do not represent the sequence of these steps.

In one case, step 1 to step 4 are executed sequentially. In another case, step 4 may be executed before step 2 and step 3. In another case, step 2 can be executed before step 1. The execution order of the steps here is only an example, and the specific implementation is not limited to this.

In the embodiment, a plurality of sets of downlink PRS configurations are included in the positioning system message, and the UE is notified of the set of PRS configurations currently used by the network through the LPP message, the MAC RAR, and the RRC message. At the same time, the network can dynamically update the set of PRS configurations in the positioning system message.

The set of downlink PRS configurations here is one of the sets of PRS configurations provided in any of the foregoing embodiments.

The method provided in this embodiment may be described as follows.

The network (LMF) sends the broadcast assistance information (NRPPa message) required for UE positioning to the base station/TRP. The broadcast assistance information pre-configures a plurality of sets of downlink PRS configurations of multiple TRPs for the UE. Specifically, the plurality of sets of downlink PRS configurations can be configured for multiple base stations/TRPs in the NR downlink positioning reference signal assistance information (nr-DL-PRS-AssistanceData) in the NR downlink measurement assistance IE (NR-DL-Measurement-AD) in the positioning system message type 6-1 (posSibType6-1). The positioning system message type 6-1 (posSibType6-1) here is a system message.

The foregoing plurality of sets of downlink PRS configurations can meet different UE positioning requirements, positioning precisions and positioning types. For example, the plurality of sets of downlink PRS configurations include different PRS sending periods, different PRS sending bandwidths, and different PRS resource IDs.

The network (LMF) can instruct the base station/TRP to use one of the plurality of sets of downlink PRSs. Specifically, the network can indicate a certain set of downlink PRS configurations used by the base station/TRP at the same time when sending the positioning broadcast assistance message.

The network (LMF) sends a positioning broadcast assistance information reconfiguration request to the base station/TRP, requesting to reconfigure the set of downlink PRS configurations. Specifically, the reconfiguration message may be implemented in the same manner as in step 1, or only an indication message may be sent to instruct to update to one of the configurations sent in step 1.

In some cases, the base station decides to use one of the above-mentioned plurality of sets of PRS configurations and informs the LMF of the result.

When receiving the broadcast assistance information required for positioning sent by the network, the base station/TRP broadcasts the plurality of sets of downlink PRS configurations in the positioning system message, returns a confirmation message to the network, and determines the set of downlink PRS configurations according to the network's indication in step 2 and sends the PRS signal.

In one way, the network sends a positioning request (such as an LPP positioning request message) to the UE, and the positioning request message indicates one of the plurality of sets of PRS configurations in the broadcast assistance message required for UE positioning mentioned in step 1. Specifically, it can be realized by adding a new IE. In another way, when the UE in the RRC connected state requests a positioning system message through on-demand SI, if the base station broadcasts the positioning system message requested by the UE through a broadcast mode, indication information is returned to the UE to indicate one of the plurality of sets of PRS configurations in the positioning assistance information broadcast by the base station: if the base station uses a dedicated way to send the positioning system message, the system message only includes the set of PRS configurations currently used by the network (that is, one of the plurality of sets of PRSs).

In another way, when the UE in the RRC idle state or the RRC inactive state requests a positioning system message in an on-demand manner, indication information is returned to indicate one of the plurality of sets of PRS configurations in the positioning assistance information broadcast by the base station. Specifically, if the UE uses a random access message 1 request, the base station only includes the RAP ID and the indication information in the sent MAC RAR (which can be implemented by defining a new MAC subPDU format). If the UE uses the RRC system message request (RRCSystemInfoRequest) message to request a positioning system message, the base station returns an indication message indicating one of the plurality of sets of PRS configurations in the positioning assistance information broadcast by the base station.

For another example, the above-mentioned indication information can be implemented in the following ways. A new IE is added and different values of the IE are used to indicate different sets of PRS configurations, i.e., all TRPs in the positioning assistance information use the same set of PRS configurations. Or, a new IE is added including each TRP ID, and for each TRP ID, different values indicate different sets of PRS configurations.

The UE determines the set of PRS configurations of the TRP or the first configuration information of the TRP according to the received PRS configuration indication information, and completes the positioning measurement.

The embodiment of the disclosure provides a method for processing a PRS configuration including the followings.

The LMF sends positioning broadcast assistance information to the base station. The positioning broadcast assistance information includes 3 sets of downlink PRS configurations corresponding to different positioning requirements, and instructs the base station to use the first one (applied to a low positioning precision requirement, a non-emergency positioning type, etc., to reduce the PRS overhead and improve the system resource utilization).

After receiving the positioning broadcast assistance information sent by the LMF, the base station broadcasts three types of downlink PRS configurations in the positioning system message, and the first type is applied.

When the UE needs to be positioned, if the UE requests a positioning system message through MSG1, the base station indicates that the first type of downlink PRS configuration is currently used by the base station in the MAC RAR. The positioning system message here is one of the aforementioned system messages, and the positioning system message is a system message including the first configuration information.

The UE completes the positioning measurement according to the indicated set of PRS configurations.

If the network has a new positioning requirement (for example, a high precision), the LMF instructs the gNB to apply the third type, and the gNB uses the third set of PRS configurations to send the PRS after receiving the request.

In this case, the set of PRS configurations can be updated in the above-mentioned manner.

Figure 5:
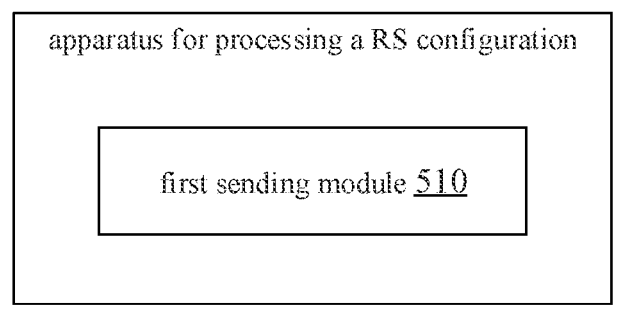
FIG. 5 is a block diagram illustrating an apparatus for processing a PRS configuration according to an embodiment.

As illustrated in FIG. 5, the embodiment of the present disclosure provides an apparatus for processing a PRS configuration, which is applied to a positioning management function (LMF) and includes a first sending module 510.

The first sending module 510 is configured to send first configuration information including a plurality of sets of PRS configurations, in which the plurality of sets of PRS configurations correspond to a same base station or a same transmission reception point (TRP), and each set of PRS configurations is configured for a positioning measurement of a user equipment (UE).

In some embodiments, the first sending module 510 may include a program module. The program module is executed by a processor, to implement sending the first configuration information including the plurality of sets of PRS configurations.

In some embodiments, the first sending module 510 may include a software and hardware combined module, which may include but be not limited to a programmable array, including but be not limited to a complex programmable array or a field programmable array.

In further embodiments, the first sending module 510 may include a pure hardware module, which may include but be not limited to an application-specific integrated circuit.

In some embodiments, different sets of PRS configurations satisfy different positioning precisions: and/or different sets of PRS configurations require different positioning overheads.

In some embodiments, different sets of PRS configurations are different in at least one of: a sending period of a PRS: a sending bandwidth of the PRS; or a sending resource of the PRS.

In some embodiments, the apparatus further includes a second sending module configured to: send a broadcast assistance message including the first configuration information to the base station or the TRP; and/or send a positioning assistance message including the first configuration information to the UE.

In some embodiments, the second sending module is further configured to send first indication information, in which the first indication information indicates to select a set of PRS configurations for positioning from the plurality of sets of PRS configurations.

In some embodiments, the second sending module is further configured to send the first indication information to the base station or the TRP through a broadcast assistance message: and/or send the first indication information to the UE through a positioning request message, in which the positioning request message further carries a trigger command for triggering positioning of the UE.

In some embodiments, the apparatus further includes a third sending module configured to: send second configuration information including a reconfiguration, in which the second configuration information comprises at least one set of updated PRS configurations or second indication information, in which the second indication information indicates at least one set of PRS configurations to be updated.

In some embodiments, the third sending module is configured to: send a broadcast assistance message including the second configuration information to the base station or the TRP.

In some embodiments, the apparatus further includes a reconfiguring module configured to: receive confirmation information of the second configuration information, in which the confirmation information is configured to indicate that the second configuration information is received.

In some embodiments, the reconfiguring module is configured to: receive a new radio positioning protocol a (NRPPa) message including the confirmation information sent by the base station or the TRP.

In some embodiments, the apparatus further includes a first receiving module configured to: receive third indication information reported by the base station or the TRP, in which the third indication information indicates a set of PRS configurations for positioning selected by the base station or the TRP from the plurality of sets of PRS configurations.

In some embodiments, the first receiving module is configured to: receive the third indication information from the base station or the TRP when the first indication information is not sent. The first indication information is sent by the LMF and configured to indicate the set of PRS configurations for positioning selected from the plurality of sets of PRS configurations.

Figure 6:
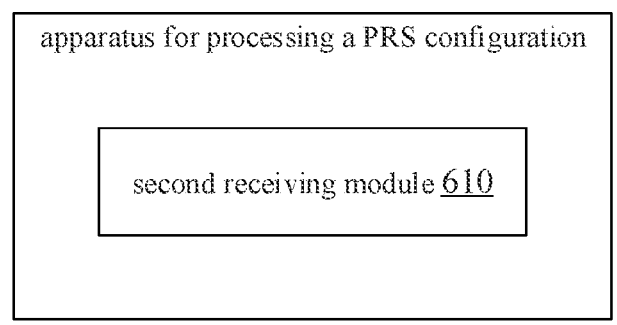
FIG. 6 is a block diagram illustrating an apparatus for processing a PRS configuration according to an embodiment.

As illustrated in FIG. 6, the embodiment of the disclosure provides an apparatus for processing a PRS configuration including a second receiving module 610.

The second receiving module 610 is configured to receive first configuration information including a plurality of sets of PRS configurations, in which the plurality of sets of PRS configurations correspond to a same base station or a same transmission reception point (TRP), and each set of PRS configurations is configured for a positioning measurement of a user equipment (UE).

In some embodiments, the second receiving module 610 may include a program module.

The program module is executed by a processor, to implement receiving the first configuration information including the plurality of sets of PRS configurations.

In some embodiments, the second receiving module 610 may include a software and hardware combined module, which may include but be not limited to a programmable array, including but be not limited to a complex programmable array or a field programmable array.

In further embodiments, the second receiving module 610 may include a pure hardware module, which may include but be not limited to an application-specific integrated circuit.

In some embodiments, the apparatus is applied in a base station or a TRP The second receiving module 610 is configured to receive a broadcast assistance message including the first configuration information.

In some embodiments, the apparatus further includes a first selecting module and a reporting module.

The first selecting module is configured to select a set of PRS configurations for positioning from the plurality of sets of PRS configurations in response to the broadcast assistance message not including the first configuration information. The first indication information is sent by the LMF and configured to indicate the set of PRS configurations for positioning selected from the plurality of sets of PRS configurations.

The reporting module is configured to report third indication information, in which the third indication information is configured to indicate the set of PRS configurations for positioning selected by the base station or the TRP.

In some embodiments, the broadcast assistance message further carries first indication information.

The apparatus further includes a second selecting module configured to selecting a configuration for positioning from the plurality of sets of PRS configurations based on the first indication information.

The apparatus further includes a third receiving module and a first sending module.

The third receiving module is configured to receive a request message of on-demand system information (SI) sent by a UE in a radio resource control (RRC) connected state.

The first sending module is configured to send a system message including the set of PRS configurations for positioning to the UE through a RRC message based on the first indication information and the request message.

In some embodiments, the apparatus further includes a fourth receiving module, and a second sending module.

The fourth receiving module is configured to receive a request message of on-demand SI sent by the UE.

The second sending module is configured to broadcast a system message including the first configuration information based on the request message, and send a RRC message including fourth indication information. The fourth indication information is determined based on the first indication information to indicate the set of PRS configurations for positioning selected from the plurality of sets of PRS configurations.

In some embodiments, the RRC message includes a first indication information element (IE) including the fourth indication information. The fourth indication information is determined based on the first indication information to indicate the set of PRS configurations for positioning selected from the plurality of sets of PRS configurations.

In some embodiments, the request message is sent by the UE when the base station or the TRP does not broadcast the system message including the set of PRS configurations or has broadcast the system message including the plurality of sets of PRS configurations.

In some embodiments, the RAR includes a first indication IE including the fourth indication information.

In some embodiments, the first indication IE carries a configuration identification of the set of PRS configurations for current positioning. A plurality of communication nodes share the set of PRS configurations identified by the configuration identification, and the communication node includes a base station and/or a TRP.

Or, the first indication IE carries a node identification of a communication node, in which the node identification has a correspondence with the set of PRS configurations.

In some embodiments, the apparatus further includes a third receiving module and a third sending module.

The third receiving module is configured to receive a random access request of a UE in a RRC idle state or a RRC inactive state.

The third sending module is configured to: in response to the random access request including a request message of the first configuration information, broadcast the system message including the first configuration information and send a random access response (RAR) including fifth indication information to the UE in the RRC idle state or the RRC inactive state. The fifth indication information is determined based on the first indication information to indicate the set of PRS configurations for positioning selected from the plurality of sets of PRS configurations.

In some embodiments, the RAR includes a second indication IE including the fifth indication information.

In some embodiments, the second indication IE carries a configuration identification of the set of PRS configurations for current positioning. A plurality of communication nodes share the set of PRS configurations identified by the configuration identification, and the communication node includes a base station and/or a TRP.

Or, the second indication IE carries a node identification of a communication node, in which the node identification has a correspondence with the set of PRS configurations.

In some embodiments, the apparatus further includes a fifth receiving module, configured to: receive a broadcast assistance message including second configuration information with a reconfiguration, in which the second configuration information includes at least one set of updated PRS configurations or second indication information indicating at least one set of PRS configurations to be updated; and update the at least one set of PRS configurations based on the second indication information.

In some embodiments, the apparatus further includes a fourth sending module configured to: in response to receiving the second configuration information, report an NRPPa message including confirmation information, in which the confirmation information is configured to indicate that the second configuration information is received.

In some embodiments, the broadcast assistance message includes a new radio (NR) downlink measurement assistance information element (IE).

NR downlink PRS assistance information in the NR downlink measurement assistance IE includes the first configuration information.

In some embodiments, the apparatus is applied in a UE. The second receiving module 610 is configured to receive a positioning assistance message including the first configuration information.

In some embodiments, the apparatus further includes a sixth receiving module, a third selecting module and a positioning module.

The sixth receiving module is configured to receive a positioning request message, in which the positioning request message carries a trigger command for triggering positioning of the UE and first indication information.

The third selecting module is configured to select a set of PRS configurations for current positioning from the plurality of sets of PRS configurations based on the first indication information.

The positioning module is configured to perform a positioning measurement based on the trigger command and the set of PRS configurations for current positioning.

In some embodiments, the positioning request message includes a third indication IE including the first indication information.

In some embodiments, the third indication IE carries a configuration identification of the set of PRS configurations for positioning. A plurality of communication nodes share the set of PRS configurations identified by the configuration identification, and the communication node includes a base station and/or a TRP.

Or, the third indication IE carries a node identification of a communication node, in which different node identifications correspond to different sets of PRS configurations.

In some embodiments, the positioning assistance message includes a provide assistance data IE, in which the provide assistance data IE carries the first configuration information.

The embodiment of the present disclosure provides a communication device, including a processor, a transceiver, a memory and executable programs stored on the memory and executed by the processor. When the processor executes the executable programs, the processor performs the method for processing first configuration information of a PRS, provided in any of the technical solutions, for example, the method for processing first configuration information of a PRS applied in the LMF, the base station and/or the TRP, such as at least one of the methods shown in FIGS. 2A-2C, FIGS. 3A-3C and FIGS. 4A-4E.

The communication device may be the aforementioned first base station or second base station.

The processor may include various types of storage media. The storage medium is a non-transitory computer storage medium that can continue to memorize and store information thereon after the communication device is powered off. Here, the communication device includes a base station or a user equipment.

The processor may be connected to the memory through a bus or the like, and is used to read executable programs stored on the memory, for example, at least one of the methods shown in FIGS. 2A-2C, FIGS. 3A-3C and FIGS. 4A-4E.

The embodiment of the present disclosure provides a computer storage medium, and the computer storage medium stores executable programs. After the executable programs are executed by a processor, the method shown in any technical solution of the first aspect or the second aspect can be implemented, for example, at least one of the methods shown in FIGS. 2A to 2C, 3A to 3C, and 4A to 4E.

Figure 7:
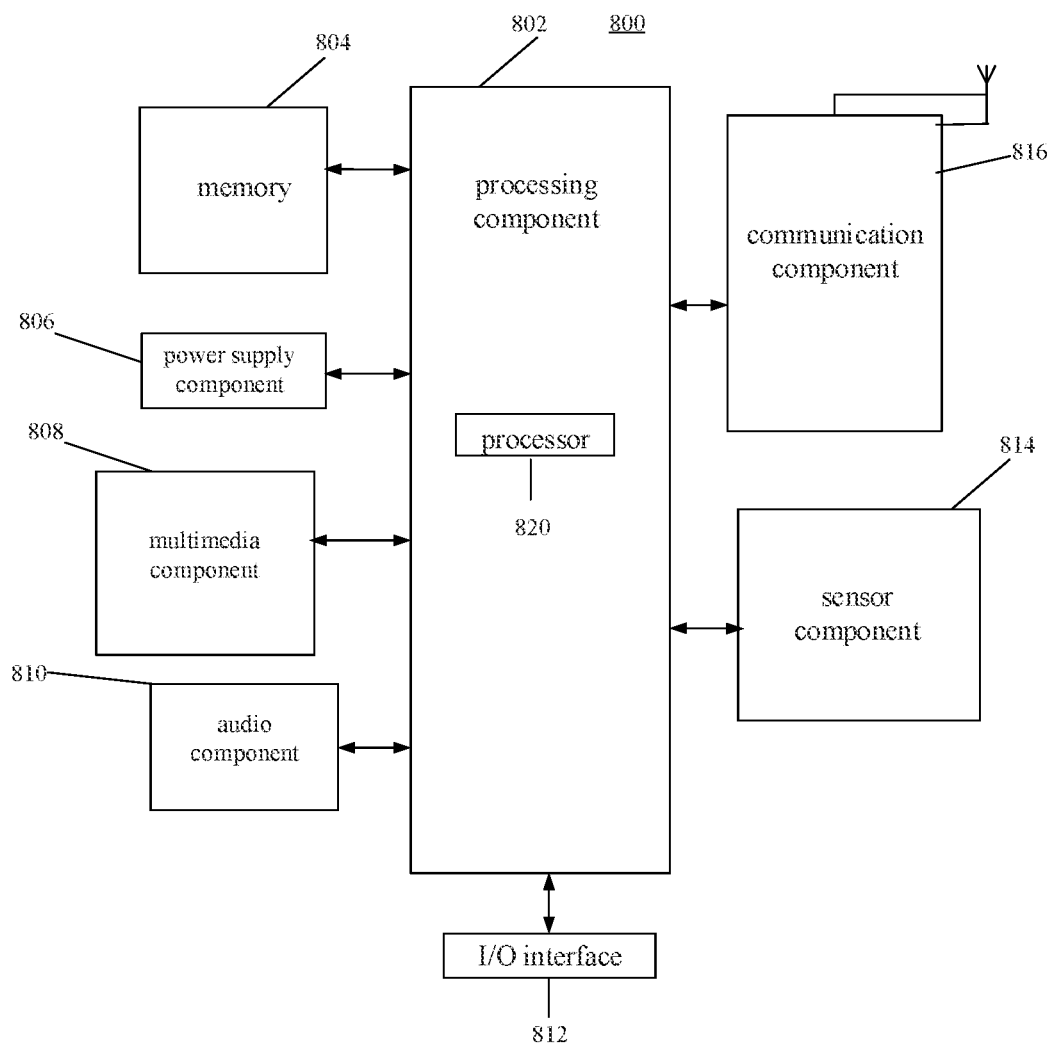
FIG. 7 is a block diagram illustrating a terminal according to an embodiment.

FIG. 7 is a block diagram illustrating a UE 800 according to an embodiment. For example, the UE 800 may be a mobile phone, a computer, a digital broadcasting UE, a messaging device, a game console, a tablet device, a medical equipment, a fitness equipment, a personal digital assistant, and so on.

Referring to FIG. 7, the UE 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the UE 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the UE 800. Examples of the data include the instructions of any applications or methods operated on the UE 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the UE 800. The power supply component 806 may include a power supply management system, one or more power supplies, and other units related to generating, managing and distributing power for the UE 800.

The multimedia component 808 includes an output interface screen provided between the UE 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the UE 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the UE 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the UE 800. For example, the sensor component 814 may detect the on/off state of the UE 800 and the relative positioning of the component. For example, the component is a display and a keypad of the UE 800. The sensor component 814 may further detect the location change of the UE 800 or one component of the UE 800, the presence or absence of contact between the user and the UE 800, the orientation or acceleration/deceleration of the UE 800, and the temperature change of the UE 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the UE 800 and other devices. The terminal 800 may access wireless networks based on communication standard, such as Wi-Fi, 2G or 3G, or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the UE 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 804 including executable instructions, the executable instructions may be executed by the processor 820 of the UE 800 to complete the above methods. For example, the non-transitory computer-readable storage medium may be a ROM, a random access memory (RAM), a CD-ROM, a magnetic tape, a floppy disk, an optical data storage device, etc.

Figure 8:
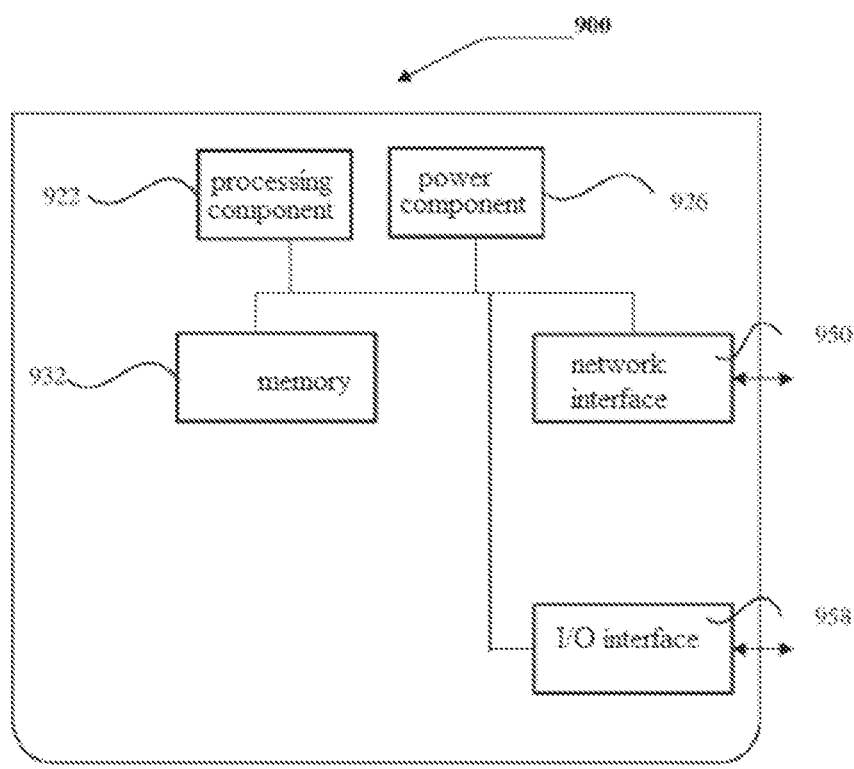
FIG. 8 is a block diagram illustrating a base station according to an embodiment.

FIG. 8 is a block diagram illustrating a base station or TRP or LMF according to an embodiment. The base station 900 may be provided as a network side device. As illustrated in FIG. 8, the base station 900 includes a processing component 922, which further includes one or more processors, and a memory resource represented by a memory 932, for storing instructions executable by the processing component 922, such as an application program. The application program stored in the memory 932 may include one or more modules each corresponding to a set of instructions. In addition, the processing component 922 is configured to execute the instructions to perform any of the methods described with reference to FIG. 2-FIG. 3.

The base station 900 may also include a power component 926 configured to perform power management of the base station 900, a wired or wireless network interface 950 configured to connect the base station 900 to a network, and an input output (I/O) interface 958. The base station 900 can operate based on an operating system stored in the memory 932, such as Windows Server™, Mac OS X™, Unix™, Linux™, FreeBSD™ or the like.

The wireless network interface 950 includes but is not limited to the antenna in the above described communication device. After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

What is claimed is:

1. A method for processing a position reference signal (PRS) configuration, comprising:
sending, by a location management function (LMF), first configuration information including a plurality of sets of PRS configurations, wherein each of the plurality of sets of PRS configurations is configured for a positioning measurement of user equipment (UE), wherein sending the first configuration information comprises at least one of:
sending a new radio positioning protocol a (NRPPa) message carrying the first configuration information to a base station or a transmission reception point (TRP), or
sending positioning assistance information to the UE, wherein the positioning assistance information is carried by a long term evolution position protocol (LPP) message and comprises: the first configuration information, or the first configuration information and at least one of a cell identification for positioning measurement or resource location information of a positioning reference signal for positioning measurement; and
sending, by the LMF, first indication information, wherein the first indication information indicates to select at least one set of PRS configurations for positioning from the plurality of sets of PRS configurations, wherein sending the first indication information comprises at least one of:
sending the first indication information to the base station or the TRP through the NRPPa message; or
sending the first indication information to the UE through the LPP message.

2. The method of claim 1, wherein different sets of PRS configurations are different in at least one of:
a sending period of a PRS;
a sending bandwidth of the PRS; or
a sending resource of the PRS.

3. The method of claim 1, further comprising:
sending second configuration information including a reconfiguration, wherein the second configuration information comprises at least one set of updated PRS configurations or second indication information, wherein the second indication information indicates at least one set of PRS configurations to be updated.

4. The method of claim 3, further comprising:
receiving confirmation information of the second configuration information, wherein the confirmation information is configured to indicate that the second configuration information is received.

5. The method of claim 1, further comprising:
receiving third indication information reported by the base station or the TRP, wherein the third indication information indicates a set of PRS configurations for positioning selected by the base station or the TRP from the plurality of sets of PRS configurations.

6. A method for processing a position reference signal (PRS) configuration, comprising:
receiving first configuration information including a plurality of sets of PRS configurations, wherein each of the plurality of sets of PRS configurations is configured for a positioning measurement of a user equipment (UE); and
receiving first indication information, wherein the first indication information indicates a location management function (LMF) to select at least one set of PRS configurations for positioning from the plurality of sets of PRS configurations;
wherein receiving the first configuration information and receiving the first indication information comprise at least one of:
receiving, from a base station or a transmission reception point (TRP), a new radio positioning protocol a (NRPPa) message carrying the first configuration information; and receiving, from the base station or the TRP, the first indication information through the NRPPa message; or
receiving, from the UE, positioning assistance information, wherein the positioning assistance information is carried by a long term evolution position protocol (LPP) message, and comprises: the first configuration information, or the first configuration information and at least one of a cell identification for positioning measurement or resource location information of a positioning reference signal for positioning measurement; and receiving, from the UE, the first indication information through the LPP message.

7. The method of claim 6, wherein the first configuration information and the first indication information are received from the base station or the TRP, the method further comprising:
reporting third indication information, wherein the third indication information is configured to indicate the set of PRS configurations for positioning selected by the base station or the TRP.

8. The method of claim 6, wherein the first configuration information and the first indication information are received from the base station or the TRP, the method further comprising:
receiving a request message of on-demand system information (SI) sent by the UE in a radio resource control (RRC) connected state; and
sending a system message including the set of PRS configurations for positioning to the UE through a RRC message based on the first indication information and the request message.

9. The method of claim 6, wherein the first configuration information and the first indication information are received from the base station or the TRP, the method further comprising:
receiving a request message of on-demand SI sent by the UE;
broadcasting a system message including the first configuration information based on the request message, and sending a RRC message including fourth indication information, wherein the fourth indication information is determined based on the first indication information to indicate the set of PRS configurations for positioning selected from the plurality of sets of PRS configurations.

10. The method of claim 6, wherein the first configuration information and the first indication information are received from the base station or the TRP, the method further comprising:

receiving a random access request from the UE in a RRC idle state or a RRC inactive state;

in response to the random access request including a request message of the first configuration information, broadcasting a system message including the first configuration information and sending a random access response (RAR) including fifth indication information to the UE in the RRC idle state or the RRC inactive state, wherein the fifth indication information is determined based on the first indication information to indicate the set of PRS configurations for positioning selected from the plurality of sets of PRS configurations.

11. The method of claim 6, wherein the first configuration information and the first indication information are received from the base station or the TRP, the method further comprising:

receiving the NRPPa message including second configuration information with a reconfiguration, wherein the second configuration information comprises at least one set of updated PRS configurations or second indication information, wherein the second indication information indicates at least one set of PRS configurations to be updated; and updating the at least one set of PRS configurations based on the second indication information.

12. The method of claim 11, further comprising:

in response to receiving the second configuration information, reporting an NRPPa message including confirmation information, wherein the confirmation information is configured to indicate that the second configuration information is received.

13. The method of claim 6, wherein the first configuration information and the first indication information are received from the UE, the method further comprising:

receiving a positioning request message, wherein the positioning request message includes a trigger command for triggering positioning of the UE and the first indication information;

selecting a set of PRS configurations for current positioning from the plurality of sets of PRS configurations based on the first indication information; and performing a positioning measurement based on the trigger command and the set of PRS configurations for current positioning.

14. A communication device, comprising:

a processor, a transceiver, and a memory storing executable programs;

wherein when the processor executes the executable programs, the processor is caused to perform:

sending, by a location management function (LMF), first configuration information including a plurality of sets of PRS configurations, wherein each of the plurality of sets of PRS configurations is configured for a positioning measurement of user equipment (UE), wherein sending the first configuration information comprises at least one of:

sending a new radio positioning protocol a (NRPPa) message carrying the first configuration information to a base station or a transmission reception point (TRP), or sending positioning assistance information to the UE, wherein the positioning assistance information is carried by a long term evolution position protocol (LPP) message and comprises: the first configuration information, or the first configuration information and at least one of a cell identification for positioning measurement or resource location information of a positioning reference signal for positioning measurement; and sending, by the LMF, first indication information, wherein the first indication information indicates to select at least one set of PRS configurations for positioning from the plurality of sets of PRS configurations, wherein sending the first indication information comprises at least one of:

sending the first indication information to the base station or the TRP through the NRPPa message; or sending the first indication information to the UE through the LPP message.

* * * * *